(12) United States Patent
Mederer et al.

(10) Patent No.: US 9,260,078 B2
(45) Date of Patent: Feb. 16, 2016

(54) TRAILER ACCESS POINT PAIRING

(71) Applicants: Martin Mederer, Munich (DE); Stefan Pahl, Munich (DE); Matthew Fry, Munich (DE)

(72) Inventors: Martin Mederer, Munich (DE); Stefan Pahl, Munich (DE); Matthew Fry, Munich (DE)

(73) Assignee: KNORR-BREMSE SYSTEM FUR NUTZFAHRZEUGE GMBH, Muenchen (DE)

( * ) Notice: Subject to any disclaimer, the term of this patent is extended or adjusted under 35 U.S.C. 154(b) by 0 days.

(21) Appl. No.: 14/379,721

(22) PCT Filed: Feb. 20, 2013

(86) PCT No.: PCT/IB2013/000440
§ 371 (c)(1),
(2) Date: Aug. 19, 2014

(87) PCT Pub. No.: WO2013/124730
PCT Pub. Date: Aug. 29, 2013

(65) Prior Publication Data
US 2015/0025766 A1    Jan. 22, 2015

(30) Foreign Application Priority Data

Feb. 20, 2012  (GB) .................................. 1202869.2

(51) Int. Cl.
*B60R 25/00*    (2013.01)
*B60R 25/08*    (2006.01)
(Continued)

(52) U.S. Cl.
CPC . *B60R 25/08* (2013.01); *B60T 7/20* (2013.01); *B60T 8/1708* (2013.01); *B60T 13/662* (2013.01); *B60T 13/683* (2013.01); *H04L 12/40006* (2013.01); *B60T 2270/413* (2013.01)

(58) Field of Classification Search
CPC ........ B60R 25/00; B60R 25/08; B60R 25/10; B60T 8/17; B60T 8/32; B60T 7/00
USPC .................. 701/70, 36, 2; 340/426.1, 426.11, 340/426.32; 303/89
See application file for complete search history.

(56) References Cited

U.S. PATENT DOCUMENTS 5,025,253 A    6/1991   DiLullo et al.
6,845,851 B1   1/2005   Donaldson et al.
(Continued)

FOREIGN PATENT DOCUMENTS

DE    10 2008 022026    11/2009
DE    10 2009 008342     9/2010
(Continued)

OTHER PUBLICATIONS

International Search Report for PCT/IB2013/000440, issued on Jul. 11, 2013.
(Continued)

*Primary Examiner* — Tan Q Nguyen
(74) *Attorney, Agent, or Firm* — Kenyon & Kenyon LLP

(57) ABSTRACT

A trailer electronic braking system includes a braking device capable of generating a braking force on a wheel on the trailer, a brake force into the brake cylinders being controllable by a braking ECU. The braking ECU is connected to a standards compliant communication bus on said trailer and is adapted to receive data inputs from sensors on the trailer. An interface to trailer electronics and a communications interface are also provided. The brake system is further adapted to transmit a trailer identifier such as an SSID, such that the trailer identifier can be paired with a further device, such as a mobile telephone associated with a tractor driver, the further device having previously been provided with the trailer identifier.

6 Claims, 3 Drawing Sheets

(51) Int. Cl.
*B60T 7/20* (2006.01)
*B60T 13/66* (2006.01)
*B60T 13/68* (2006.01)
*B60T 8/17* (2006.01)
*H04L 12/40* (2006.01)
*B60T 7/00* (2006.01)

(56) References Cited

U.S. PATENT DOCUMENTS

| | | | |
|---|---|---|---|
| 2003/0233189 A1* | 12/2003 | Hsiao et al. | 701/207 |
| 2004/0036350 A1* | 2/2004 | Rowe et al. | 303/89 |
| 2004/0093143 A1 | 5/2004 | Fry | |
| 2004/0190720 A1* | 9/2004 | Harvey | 380/258 |
| 2006/0011721 A1* | 1/2006 | Olsen et al. | 235/385 |
| 2006/0284476 A1* | 12/2006 | Choucair et al. | 303/7 |
| 2007/0241868 A1 | 10/2007 | Fackrell et al. | |
| 2008/0257656 A1 | 10/2008 | Skinner et al. | |
| 2010/0152989 A1 | 6/2010 | Smith et al. | |
| 2010/0188203 A1 | 7/2010 | Wallace et al. | |
| 2010/0211277 A1 | 8/2010 | Craig et al. | |
| 2010/0222979 A1 | 9/2010 | Culbert et al. | |

FOREIGN PATENT DOCUMENTS

| | | |
|---|---|---|
| EP | 1 312 492 | 5/2003 |
| EP | 1 538 040 | 6/2005 |
| EP | 1 593 552 | 11/2005 |
| EP | 1 698 535 | 9/2006 |
| GB | 2 363 435 | 12/2001 |
| GB | 2 462 194 | 2/2010 |
| WO | 2005/115811 | 12/2005 |
| WO | 2006/089284 | 8/2006 |
| WO | 2006/133535 | 12/2006 |

OTHER PUBLICATIONS

European Patent Office, International Preliminary Report on Patentability dated Aug. 26, 2014, from International Patent Application No. PCT/IB2013/000440, filed on Feb. 20, 2013.

\* cited by examiner

TRAILER ACCESS POINT PAIRING

FIELD OF THE INVENTION

The present invention relates to a trailer electronic braking system.

BACKGROUND INFORMATION

The trend in modern distribution systems is towards having large distribution depots located on the outskirts of towns and cities near main trunk roads. These large distribution depots have a number of significant logistical advantages for the operators in terms of stock control and speed and ease of distribution of goods. However, depots have become larger with many having dozens or even hundreds of trailers on site and allocated a job at any one time. In particular for larger companies, it has become difficult to track the trailer use in the depot due to the sheer number of trailers and due to the use of standardized trailers having identical appearance.

Furthermore, trailers for many goods are loaded and then moved from a known loading bay to a parking area to await a tractor or prime mover to take it to its destination. Trailers used in this environment will be assigned a trailer number or identifier. To reduce the risk that a driver takes the wrong trailer, there is usually an independent manual check at the exit gate that the driver has taken the correct trailer.

Patent document WO 2005/115811 discusses an anti-theft system for a trailer comprising an immobiliser which is adapted to communicate with an identified mobile telephone.

This system has given rise to significant logistical efficiencies but is still prone to human error and has a high degree of manual input. This slows down the operation of the trailer depot and results in additional costs for operators due to the inefficient use of resources.

SUMMARY OF THE INVENTION

The present invention seeks to provide apparatus to assist depot operators in the optimization of the use of trailers.

According to the present invention there is provided a trailer electronic braking system comprising a braking device capable of generating a braking force on a wheel on the trailer, a brake force into the brake cylinders being controllable by a braking ECU, which braking ECU is connected to a standards compliant communication bus on said trailer and is adapted to receive data inputs from sensors on the trailer, wherein the system further comprises an arrangement to interface to trailer electronics and a communications interface, wherein the brake system is further adapted to transmit a trailer identifier, such that the trailer identifier can be paired with a further device, which further device has previously been provided with the trailer identifier.

The further device may be a mobile telephone used by the intended driver of a tractor associated with the trailer or alternatively a navigation system on the tractor. The trailer could also be associated with a further trailer in a road train.

The communication interface may comprise a 802.11 wireless interface, which interface is adapted to transmit an SSID, the trailer identifier comprising the SSID.

The trailer electronic braking system may be provided with a list of MAC addresses associated with allowable further devices, the braking system detecting the MAC address of any further devices it detects such that it only pairs with an allowable Mac address.

The further device may be provided with parking brake releases codes, which codes can be transmitted to the braking ECU after pairing to thereby release the parking brake.

In a road train, the road train may comprise two or more trailers, at least two of which trailers are adapted to transmit a trailer identifier, wherein a first trailer for connection to a tractor or prime mover is adapted to request or detect the trailer identifier of another trailer, wherein if the trailer identifier is associated with the road train, the first trailer instructs the second trailer to stop transmitting its trailer identifier.

The system of the present invention advantageously speeds up the pairing of a tractor and a trailer compared to the existing manual solutions.

The trailer access point may be provided with an SSID, which SSID is equal to or comprises at least one of the trailer identifier and vehicle identification number (VIN).

In this embodiment, the present invention advantageously permits the adoption of this system in very large trailer depots, where there may be hundreds of trailers and hundreds of wireless systems, which would otherwise become confusing for the driver and operator.

The pairing information may be sent by SMS or e-mail to the driver. The SMS or e-mail may include codes to release the parking brake on the trailer. Alternatively, it would be possible to pair the trailer and tractor using a barcode or 2D barcode, which is readable using a smartphone or similar device. The required barcode could be sent to the smartphone and matched.

Exemplary embodiments of the present invention will now be described in greater detail with reference to the drawings.

DETAILED DESCRIPTION

Figure 1:
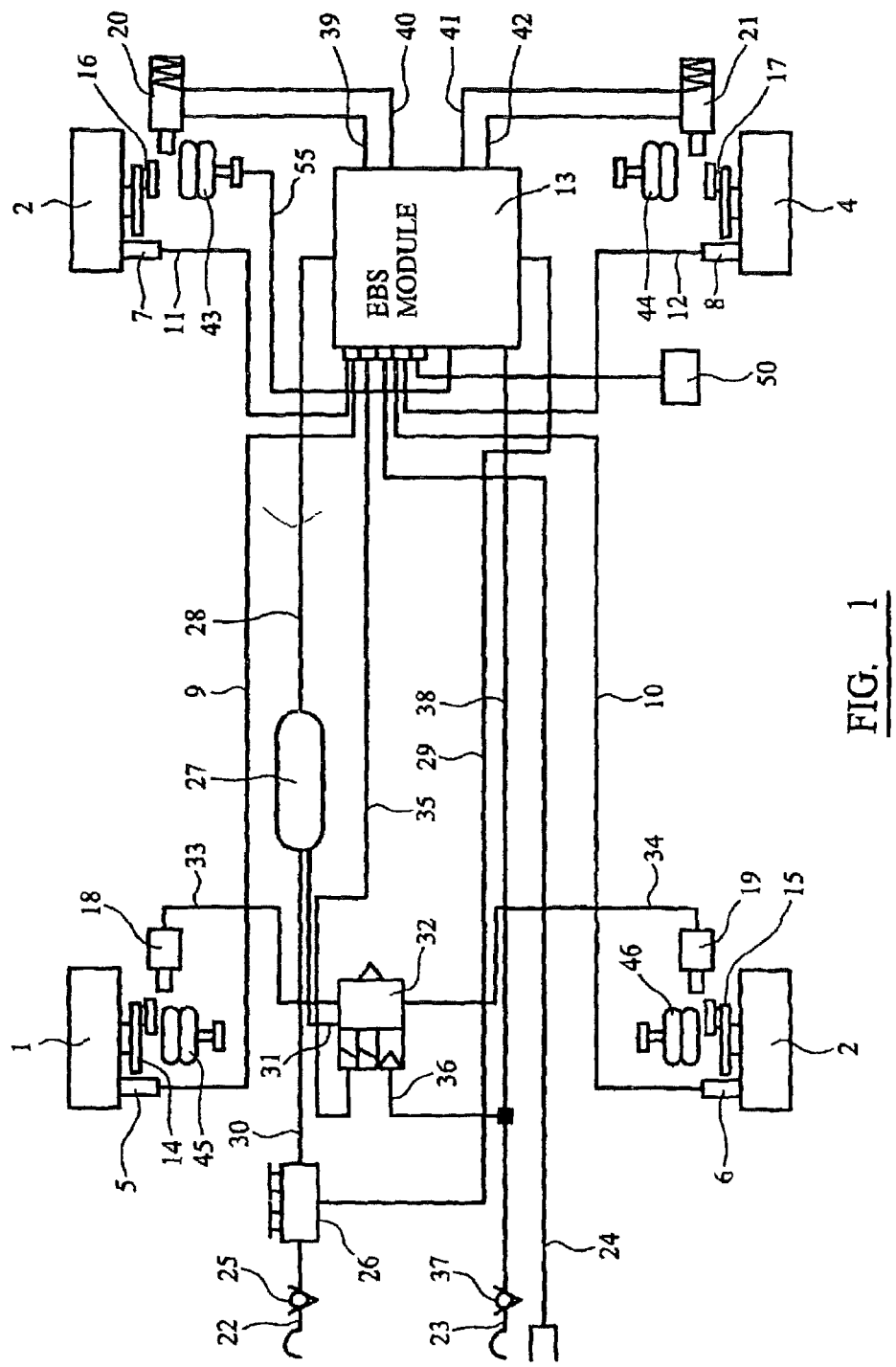
FIG. 1 shows a trailer electronic braking system.

The utility vehicle trailer has a steerable front axle with front wheels 1, 2 and a rear axle with rear wheels 3, 4. Rotational wheel speed sensors 5-8 are in each case assigned to the front wheels 1, 2 and the rear wheels 3, 4, and are connected by way of electric lines 9-12 with an electropneumatic brake pressure control module 13 (EBS module) which is primarily assigned to the rear axle brakes. One brake 14-17 is in each case assigned to the front wheels 1, 2 and the rear wheels 3, 4, which brake 14-17 can be applied by brake cylinders 18, 19 of the front axle or spring-loaded brake cylinders 20, 21 of the rear axle.

The braking system of the trailer vehicle can be connected by way of three connections, specifically a pneumatic supply line connection 22, a pneumatic control line connection 23 and an electric control connection 24, with the braking system of a tractor or a further trailer. The electric control line 24 provides the ISO 11992 CAN data connection.

The supply line connection 22 is connected by way of a filter valve 25 and a parking valve 26 with an air brake reservoir 27. From the air brake reservoir 27, a pneumatic line 28, 30 leads to a supply input of the pressure control module 13 and electropneumatic valve 32, which is adapted to supply ABS functionality. In addition, a pneumatic line 29 branches off the parking valve 26 to the pressure control module 13. A pneumatic line 30 extends between the parking valve 26 and the air brake reservoir 27.

The electropneumatic valve 32 is assigned jointly to both brake cylinders 18, 19 of the front axle and is connected with the brake cylinder 18 by way of a pneumatic line 33 and with the brake cylinder 19 by way of a pneumatic line 34. The valve 32 has two electric control inputs which are connected by way of "one" electric communication line 35 such as CAN, shown here only schematically, with the pressure control module 13.

Furthermore, the valve 32 has a pneumatic control input 36 which is connected by way of a filter valve 37 with the pneumatic control connection 23. The pneumatic control input 36 is also connected by way of a pneumatic control line 38 with a pneumatic control input of the pressure control module 13. The pressure control module 13 has an integrated pressure sensor (not shown) which measures the pressure in the pneumatic control line 38, that is, the control pressure present at the pneumatic control input 36 of the electropneumatic valve, which control pressure is identical to the maximal pressure which can be controlled into the brake cylinders 18, 19.

The pressure control module 13 has pneumatic outputs 39-42 which are connected by way of assigned pneumatic lines with the spring brake cylinders 20 or 21.

Furthermore, air bellows 43, 44 are provided at the rear axle and permit a determination of the axle load, particularly of the dynamic axle load during braking and starting. The air bellows 43, 44 are connected by way of pneumatic lines with the pressure control module 13. The pressure control module 13 has an integrated pressure sensor (not shown) which measures the pressure in the air bellows 43, 44. Correspondingly the pressure in airbags 45, 46 provided at the front axle, which here are electrically controlled, may be detected by an optional pressure transducer.

To provide stability control a lateral acceleration sensor is provided, which may also be integrated with a yaw sensor, and the output of the lateral acceleration sensor is fed to the pressure control module/ECU 13. Typically the lateral acceleration sensor is integrated into the pressure control module/ECU 13. In the event that lateral acceleration on the trailer is detected, the pressure control module can provide for increased brake force at the front and/or rear axles. When the lateral acceleration sensor detects lateral acceleration on the trailer in which it is installed, the sensor generates a signal setting the stability control to active.

The pressure control module 13 receives data from the wheel speed sensors on the trailer and also receives a signal indicating whether the brake pedal in the vehicle cab is depressed or not, as well as the brake pressure demand.

Figure 2:
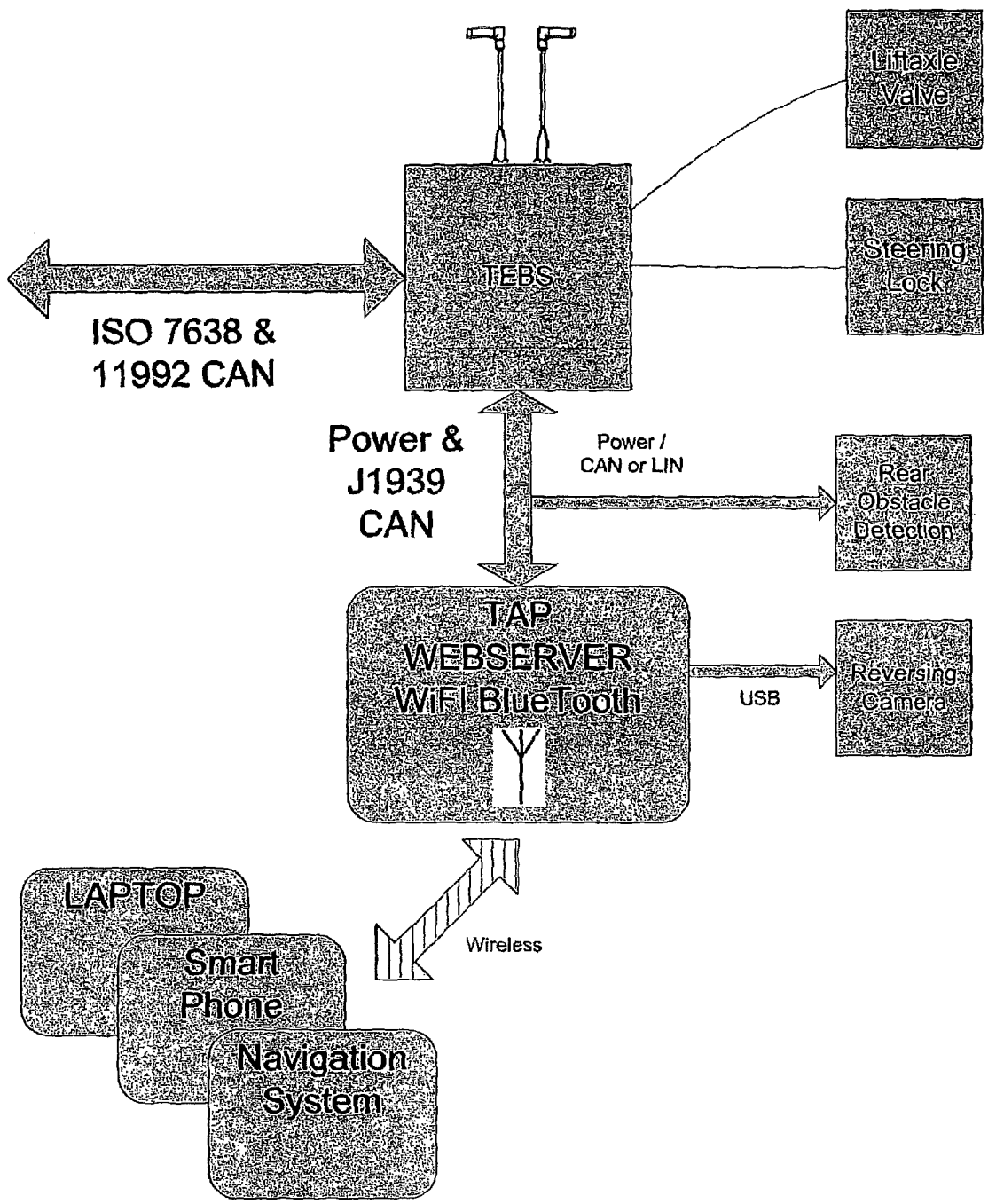
FIG. 2 shows a schematic diagram of the brake control with a trailer access microcontroller.

FIG. 2 shows schematically the arrangement of the trailer access microcontroller with the trailer electronic braking system. The trailer electronic braking system is only partially illustrated for reasons of clarity but includes the pressure control module 13 which is shown receiving wheel speed signals from wheel speed sensors 5,6. The pressure control module 13 also receives inputs from the lift axles showing the position of the lift axles and also the steering lock. The pressure control module 13 also receives power and data via an electrical connection from the tractor and is also attached to an ISO 11992 CAN databus.

A trailer access point (TAP) comprising microcontroller 60 with a CAN interface is also provided, which is powered from the electrical connection. The microcontroller 60 itself comprises an interface to the on-board electronic systems and the trailer electronic braking system and an interface for sending and receiving data in a wireless format 61. The communications interface 61 can comprise one or more of a 802.11 transceiver or Bluetooth transceiver or radio transceiver. The trailer access point is connected to the CAN bus on the trailer and so is able to receive data from other devices on the CAN bus. The trailer access point can further be provided with USB ports, which enables the addition of peripheral devices on the trailer. An exemplary device on the CAN bus is the rear obstacle detector 62 and an exemplary device attached to the USB port is a reversing camera. USB may be used in this case as the camera would generate large amounts of data compared to the remaining data on the CAN bus.

The trailer access point can be mounted in a housing similar to that used for a trailer information module but without a display being necessary. If a display is needed, it would be possible to use a bistable cholestatic display or zero power LCD display.

In use, when the trailer access point is powered, the provision of the access point enables the data from the devices to be read by another device with a client browser. Such devices could include a tractor navigation system or a smartphone. It would also be possible to use a laptop. The present invention enables the data to be made available to the driver during normal operation as well as to a service technician for maintenance purposes at low cost using standard devices.

The trailer access point can be mounted in a housing similar to that used for a trailer information module but without a display being necessary. If a display is needed, it would be possible to use a bistable cholestatic display or zero power LCD display.

The trailer access point comprises the microcontroller with an interface to the on-board electronic systems and the trailer electronic braking system and an interface for sending and receiving data in a wireless format; the microcontroller is adapted to operate with an optional display as described above and also with the onboard diagnostics. The trailer access point is also provided with USB ports, which facilitate the use of peripheral devices at low cost such as a webcam. A webcam could therefore be used as a reversing camera or it would be possible to use an internal webcam inside the trailer body. An internal webcam is attractive as it would enable free cargo space to be to be estimated by the driver or operator and would also help prevent thefts or stowaways. It would be possible if the trailer has sufficient communication bandwidth available to continuously monitor the contents of a trailer. It would also be possible to attach a number of devices to the CAN bus. Exemplary devices include door status or obstacle detection sensors or environment sensors.

In use, when the trailer access point is powered, the provision of the trailer access point enables the data from the devices to be read by another device with a client browser. Such devices could include a tractor navigation system or a smartphone. It would also be possible to use a laptop.

Each trailer is provided with a vehicle identification number (VIN), which is usually provided on a plate on the side of the trailer. These plates are also often provided with a barcode or other machine readable data recording the same information. The wireless communication card on the trailer access microcontroller is provided with its own identifier such as the service set identifier or SSID for an 802.11 card. The SSID can also be set to be the same as or include the trailer VIN. The depot operator or truck driver is then provided with a device such as a smartphone so that the handheld device can be used to pair with the microcontroller and hence trailer with the truck. If the truck is provided with a navigation system, it may be used. To provide some additional security, the trailer access microcontroller is provided with a list of allowed MAC addresses with which it is permitted to pair. Pairing in this context refers to the two devices establishing a relationship using a shared secret such as a link key so that they can identify one another. Once the communication is established between the two devices they are in effect bonded until the communication is broken.

Figure 3:
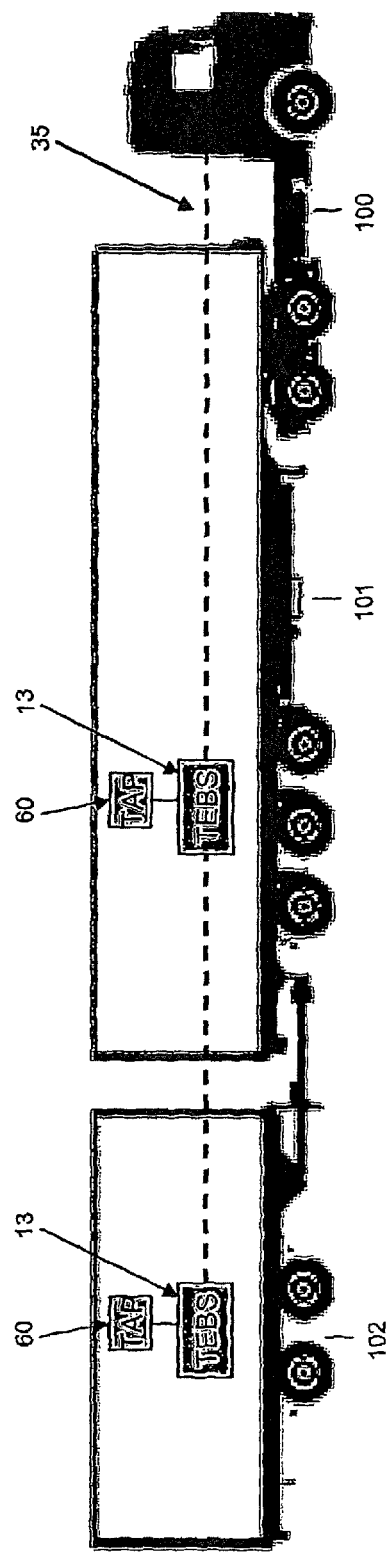
FIG. 3 shows schematically a road train.

FIG. 3 shows a further embodiment for use in a road train. A road train consists of a tractor or prime mover 100 and two or more trailers 101, 102. Each trailer is provided with an electronic brake control unit 13 and a trailer access microcontroller 60. This situation gives rise to several new problems. The trailer access microcontroller will not have external antennae and so will not transmit over long distances—some road trains can be 100 m long.

It is possible depending on the technology used in the wireless communications of the trailer access microcontroller that the signal from the microcontroller 60' of the second trailer 102 is too weak to be seen by the truck 100. However, if the signal strength is higher, then it is likely to be confusing in a depot as there will be a significant number of trailers providing signals that can be detected by the truck 100. In this case, the IDs of the respective trailers should be set to be the same.

This problem can be solved. The first trailer 101 will know that it is connected to the tractor 100 as it will receive a corresponding signal via the ISO 11992 connection. The microcontroller 60 of the first trailer 101 then requests the ID or VIN from the surrounding trailers. Where the trailer access microcontroller detects that the ID is the same as its own ID, then it transmits a signal to that microcontroller 60' to instruct that the second trailer 102 stops transmitting an ID. For multi-trailer road trains, this can be repeated down the train.

Although the trailer access point has been specifically described as a microcontroller, it would be possible to incorporate the functionality as an auxiliary function in the trailer electronic brake control unit. The trailer electronic brake control unit receives the operational data from the sensor outputs but would need to have an additional communication interface to be able to provide the interface to the standards compliant browser or client.

The invention claimed is:

1. A trailer electronic braking system, comprising:
    a braking device capable of generating a braking force on a wheel on the trailer, a brake force into the brake cylinders being controllable by an electropneumatic braking pressure control module, wherein the electropneumatic braking pressure control module is connected to a standards compliant communication bus on the trailer and is adapted to receive data inputs from sensors on the trailer; and
    an interface arrangement to interface trailer electronics and a communications interface, the communications interface having a wireless device configured to transmit a trailer identifier, which includes a service set identifier (SSID), for enabling pairing with a further device receiving the trailer identifier.

2. The trailer electronic braking system of claim 1, wherein the interface arrangement includes a microcontroller.

3. The trailer electronic braking system of claim 1, wherein the wireless card includes an 802.11 wireless card, which is adapted to transmit the SSID, the trailer identifier including the SSID.

4. The trailer electronic braking system of claim 1, wherein the trailer electronic braking system is provided with a list of MAC addresses associated with allowable further devices, and wherein the braking system detects the MAC address of any further devices it detects such that it only pairs with an allowable MAC address.

5. The trailer electronic braking system of claim 1, wherein the further device is provided with parking brake releases codes, which codes can be transmitted to the electropneumatic braking pressure control module after pairing to release the parking brake.

6. The trailer electronic braking system of claim 1, wherein the road train includes two or more trailers, at least two of which trailers are adapted to transmit the trailer identifier for each of the trailers, wherein a first trailer for connection to a tractor or prime mover is adapted to request or detect the trailer identifier of another trailer, wherein if the trailer identifier is associated with the road train, and wherein the first trailer instructs the second trailer to stop transmitting the trailer identifier of the second trailer.

* * * * *